United States Patent [19]
Nanjyo

[11] Patent Number: 5,508,869
[45] Date of Patent: Apr. 16, 1996

[54] SLIDING TYPE MAGNETIC HEAD FOR MAGNETO-OPTICAL RECORDING

[75] Inventor: Shinichi Nanjyo, Miyagi, Japan

[73] Assignee: Sony Corporation, Tokyo, Japan

[21] Appl. No.: 291,492

[22] Filed: Aug. 17, 1994

Related U.S. Application Data

[63] Continuation of Ser. No. 56,915, May 5, 1993, abandoned.

[30] Foreign Application Priority Data

May 14, 1992 [JP] Japan ..................... 4-122253

[51] Int. Cl.⁶ .................................. G11B 5/127
[52] U.S. Cl. .......................... 360/114; 360/103
[58] Field of Search .............. 360/59, 63, 114, 360/122, 129, 103

[56] References Cited

U.S. PATENT DOCUMENTS

| | | | |
|---|---|---|---|
| 5,003,423 | 3/1991 | Imamura et al. | 360/129 |
| 5,202,863 | 4/1993 | Miyatake et al. | 360/122 |
| 5,251,089 | 10/1993 | Hara | 360/122 |

FOREIGN PATENT DOCUMENTS

3524424A1  1/1986  Germany.
3730969A1  3/1989  Germany.

OTHER PUBLICATIONS

Patent Abstracts of Japan, vol. 13, No. 222 (p. 876) 24 May 1989 & JP 1-35714.

Patent Abstracts of Japan, vol. 17, No. 422 (p. 1586) 5 Aug. 1993 & JP 5-81724.

*Primary Examiner*—W. R. Young
*Attorney, Agent, or Firm*—Hill, Steadman & Simpson

[57] ABSTRACT

A magnetic head for magneto-optical recording comprises a head body (32) having a sliding portion (37) which causes a head element to come in sliding contact with a magneto-optical disc (1). The sliding portion (37) is disposed on an inner periphery of the magneto-optical disc (1) relative to a central magnetic pole core (14a) of the head element so that, even when the central magnetic pole core 14a is located at an outer peripheral point (A) of the magneto-optical disc (1), the sliding portion (37) can be prevented from hitting a bump portion formed on the outer periphery of the magneto-optical disc (1). Thus, in the sliding type magnetic head for magneto-optical recording, a utilization factor of a reliable recording and reproducing region of the magneto-optical disc (1) can be improved.

1 Claim, 15 Drawing Sheets

SLIDING TYPE MAGNETIC HEAD FOR MAGNETO-OPTICAL RECORDING

This is a continuation of application Ser. No. 08/056,915, filed May 5, 1993, abandoned.

BACKGROUND OF THE INVENTION

1. Field of the Invention

The present invention relates to a sliding-type magnetic head for magnetooptically recording information on a magneto-optical recording medium in sliding contact therewith.

2. Description of the Relevant Art

One of optical discs for storing, erasing, and retrieving information with a light beam is known as a magneto-optical disc.

As shown in FIG. 1 of the accompanying drawings, a conventional magneto-optical disc 1 comprises a transparent substrate 2, a magneto-optical recording layer 3 in the form of a perpendicularly magnetizable film disposed on the transparent substrate 2 with an SiN protective film 8 interposed therebetween, a reflecting film 4 in the form of a thin metal film such as an aluminum film disposed on the magneto-optical recording layer 3 with another Sin protective film 8 interposed therebetween, and a protective film 5 as of an ultraviolet-curing resin disposed on the reflecting film 4, Field- and beam-modulating recording processes are known for recording information on magneto-optical discs.

The field-modulating recording process is capable of recording information in an overwrite mode in which a new signal is recorded over an old signal on the magneto-optical disc. The field-modulating recording process will be described below with reference to FIG. 2 of the accompanying drawings. An optical pickup for applying a laser beams 6 is disposed on one side of a magneto-optical disc 1 with a magneto-optical recording layer in the form of a perpendicularly magnetizable film, i.e., on the substrate side of the magneto-optical disc 1, and a magnetic field generator, i.e., a magnetic head 7, is disposed on the other side of the magneto-optical disc 1, i.e., on the protective film side, for movement in synchronism with the laser spot. The direction of the magnetic field generated by the magnetic head 7 is varied by varying the direction of an electric current supplied to the magnetic head 7.

In operation, the magneto-optical disc 1 is rotated about its own center at a predetermined speed.

It is assumed that a magnetic field representing a recording signal is generated in the vicinity of a laser spot 6a on the magneto-optical disc 1. A region 1A of the magneto-optical disc 2, in which recorded information is to be rewritten, is heated to the Curie temperature by the laser spot 6a and hence demagnetized. When the region 1A is moved out of the laser spot 6a on rotation of the magneto-optical disc 1, the temperature of the region 1A drops below the Curie temperature, and the region 1A is magnetized in the direction of the applied magnetic field, thus recording the signal.

The magneto-optical disc 1 is a non-contact recording medium, i.e., the magnetic head 7 is spaced from the magneto-optical disc 1 by a predetermined distance $d_0$.

The assignee of the present application has developed an ultrasmall-size digital recording and reproducing apparatus for digitally recording information on and reproducing information from an ultrasmall-size magneto-optical disc. This recording and reproducing apparatus employs a field-modulating type magneto-optical recording system and is capable of recording information on a magneto-optical disc in an overwrite mode.

Since the conventional magnetic head 7 is held out of contact with the magneto-optical disc 1 when recording information thereon, the magnetic head 7 is associated with an electromagnetic servo mechanism for causing the magnetic head 7 to follow disc surface displacements that occur due to any inclination of the magneto-optical disc 1, thickness irregularities thereof, etc., when the magneto-optical disc 1 rotates. The presence of the electromagnetic servo mechanism has posed limitations on a recording and reproducing apparatus with respect to efforts to reduce power consumption and apparatus size (particularly apparatus thickness).

Therefore, the assignee of the present application has developed sliding type magnetic heads for magneto-optical recording shown in FIGS. 3A, 3B through FIGS. 6A, 6B.

As shown in FIGS. 3A and 3B, a magnetic head 11 comprises a head element 15 in which a coil 13 is wound around a bobbin 12 having a terminal base 17 having terminals 16 mounted thereon and a flange portion 12a and a ferrite magnetic core 14 of E-shaped configuration in cross section composed of a central magnetic pole core 14a and a side magnetic pole core 14b is disposed so that the central magnetic pole core 14a is inserted into the central aperture of the bobbin 12 and a sheet-shaped sliding portion 18 wound around the head element 15 so as to protrude the top of the central magnetic pole core 14a along the surface of the flange portion 12a. Wire ends of the coils 13 are coupled to the terminals 16, respectively. Reference numeral 19 depicts a head arm made of a resilient material for supporting the magnetic head 11.

Since the sheet-shaped sliding portion 18 is brought in sliding contact with the surface of the magneto-optical disc 1 and the central magnetic pole core 14a is out of direct contact with the disc surface, the magnetic head 11 can be smoothly slid on the surface of the magneto-optical disc 1. Even when the magneto-optical disc 1 has surface irregularities such as bumps or the like, shocks that are imposed upon the magneto-optical disc 1 by the bump or the like are absorbed by the sheet-shaped sliding portion 18 and hence alleviated.

As shown in FIGS. 4A and 4B, a magnetic head 21 comprises a head element 15 in which a coil 13 is wound around a bobbin 12 having terminal bases 17 with terminals 16 implanted thereon and a flange portion 12a and a ferrite magnetic core 14 of E-shaped configuration is mounted on the bobbin 12. Also, the bobbin 12 spaced from the flange portion 12a by a predetermined distance includes at its top a plurality of, for example, eight radially extended portions 22 and spherical sliding portions 23 unitarily formed with the tops of the extended portions 22.

Since the tops of the radially extended portions 22 are brought in sliding contact with the disc surface and the central magnetic pole core 14a is not brought in contact with the disc surface, the magnetic head 21 can be smoothly slid on the surface of the magneto-optical disc 1.

A magnetic head 25 shown in FIG. 5 is a modified example of the above magnetic head 21. As shown in FIG. 5, the four radially extended portions 22 have one or two sliding portions 23 mounted on the tops thereof.

A magnetic head 27 shown in FIGS. 6A and 6B has a circular sliding portion 28 formed on the top of the bobbin 12 spaced from the flange portion 12a. A coil receiving portion 29 incorporates therein a coil spring (not shown) that applies a predetermined load onto the magnetic head 27 to cause the magnetic head 27 to be brought in contact with the disc surface.

As shown in FIG. 7, the magneto-optical disc 1 has a region n in which information can be reliably recorded and reproduced (hereinafter simply referred to as a reliable recording and reproducing region n) extending toward an outer peripheral point A of the recording layer 3 and the protective film 5 has a bump portion 5a formed from the outer peripheral point A to the outermost periphery of the magneto-optical disc 1.

The above-mentioned magnetic head 11, 21, 25 or 27 has the sliding portions 18, 23 or 28 disposed about the central magnetic pole core 14a in the multiple angle directions (360°) so that, when the central magnetic pole core 14a is brought about to the point A, the sliding portion 18, 23 or 28 hits the bump portion 5a formed on the outermost periphery of the magneto-optical disc 1. Thus, the bump portion 5a exerts a bad influence upon the transport of the magnetic head 11, 21, 25 or 27 to cause the optical pickup system to be defocused and the head element to have a spacing loss, etc.

To avoid the sliding portion from hitting the bump portion 5a, it is unavoidable that an actual recording and reproducing region must be made narrower than the aforesaid reliable recording and reproducing region n.

OBJECTS AND SUMMARY OF THE INVENTION

Therefore, it is an object of the present invention to provide an improved sliding type magnetic head for magneto-optical recording in which the aforesaid shortcomings and disadvantages encountered with the prior art can be eliminated.

More specifically, it is an object of the present invention to provide a magnetic head for magneto-optical recording in which an actual recording and reproducing region can be widened and a utilization factor of a so-called reliable recording and reproducing region can be improved.

It is another object of the present invention to provide a magnetic head for magneto-optical recording in which a sliding portion can be increased in reliability.

It is a further object of the present invention to provide a sliding type magnetic head for magneto-optical recording in which a recording medium and a disc cartridge that accommodates therein the recording medium can both be miniaturized.

According to a first aspect of the present invention, there is provided a sliding type magnetic head for magneto-optical recording which comprises a head body, the head body having a head element and a sliding portion which comes in sliding contact with a recording medium, wherein the sliding portion is disposed on an inner periphery of the recording medium relative to a central magnetic pole core of the head element.

According to a second aspect of the present invention, there is provided a sliding type magnetic head for magneto-optical recording which comprises a head body, the head body having a head element and a sliding portion which comes in sliding contact with a recording medium, wherein the sliding portion is disposed on extending portions which are extended with an inclination toward an inner periphery of the recording medium from a top of a coil bobbin of the head element.

As a third aspect of the present invention, there is provided a sliding type magnetic head for magneto-optical recording which comprises a head body, the head body having a head element and a sliding portion which comes in sliding contact with a recording medium, wherein the sliding portion is integrally formed with a top of a coil bobbin independently of a flange portion of the coil bobbin of the head element.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of a sliding type magnetic head for magneto-optical recording according to the present invention will hereinafter be described with reference to the drawings.

Figure 1:
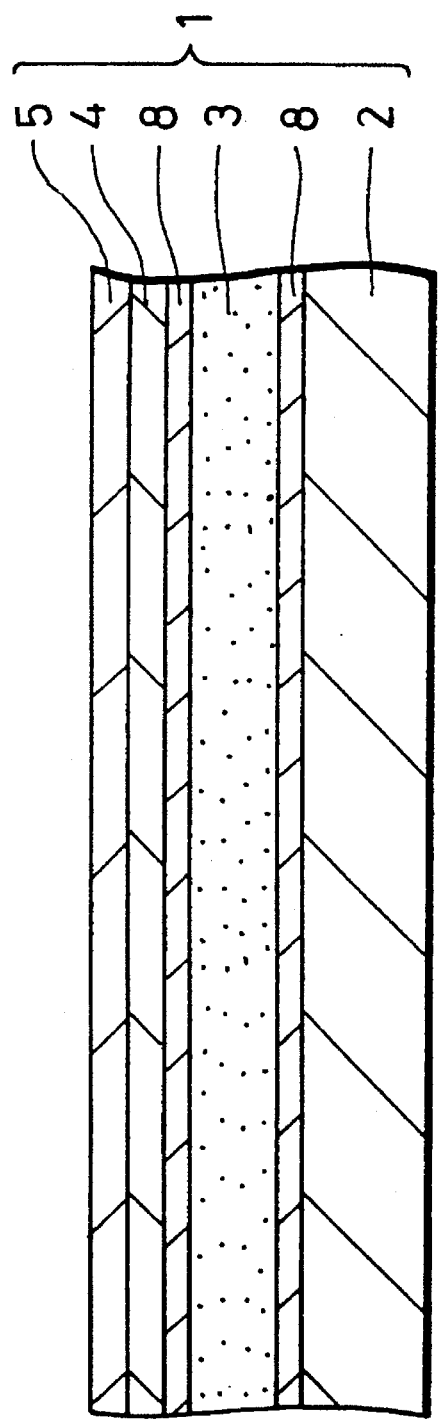
FIG. 1 is a fragmentary cross-sectional view of a magneto-optical disc.
Figure 2:
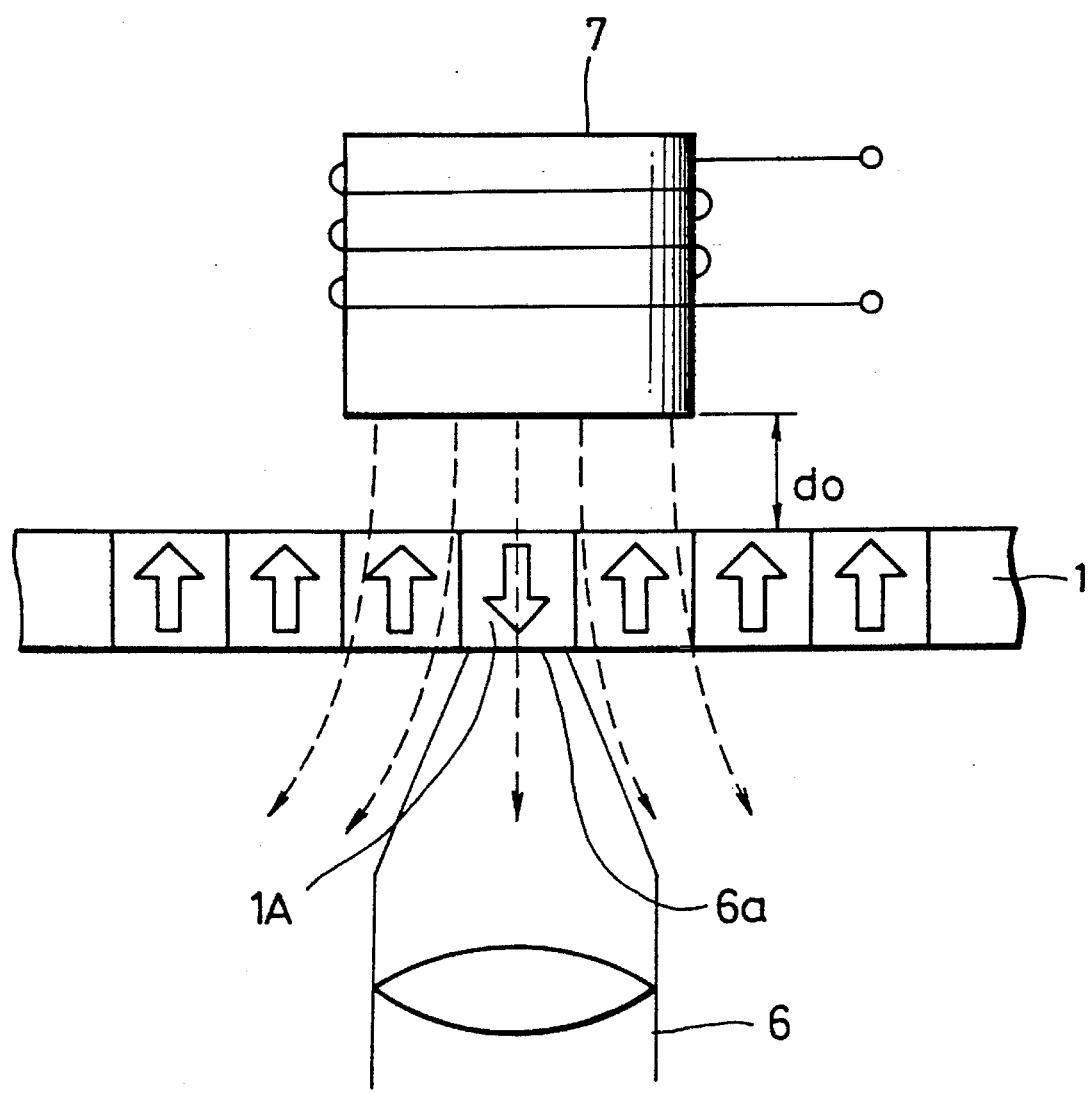
FIG. 2 is a diagram illustrative of a field-modulating recording process that is being carried out on the magneto-optical disc.
Figure 3A:
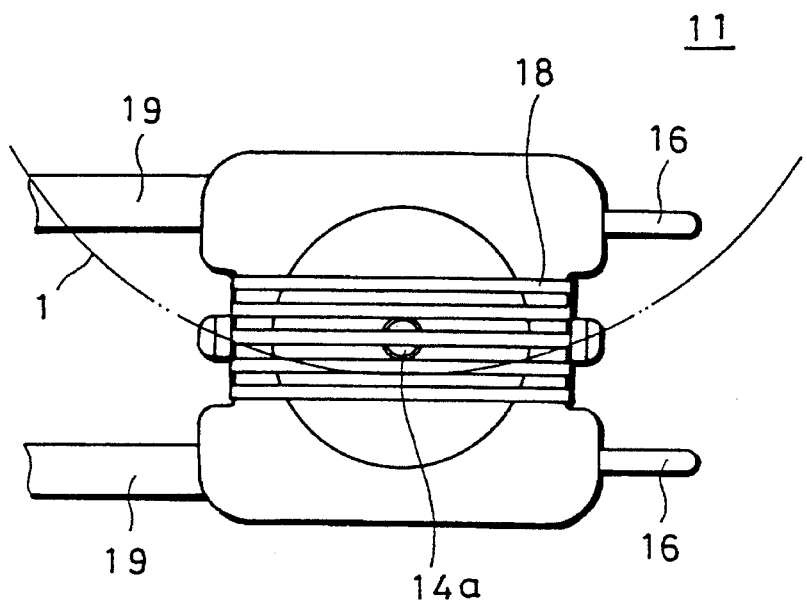
FIG. 3A is a plan view showing a first comparative example of a sliding type magnetic head for magneto-optical recording.
Figure 3B:
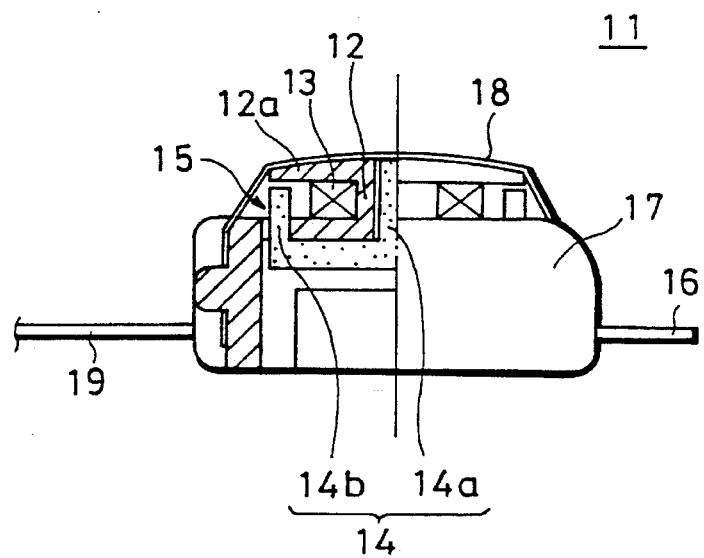
FIG. 3B is a side elevational view showing the magnetic head of FIG. 3A in a fragmentarily cross-sectional fashion.
Figure 4A:
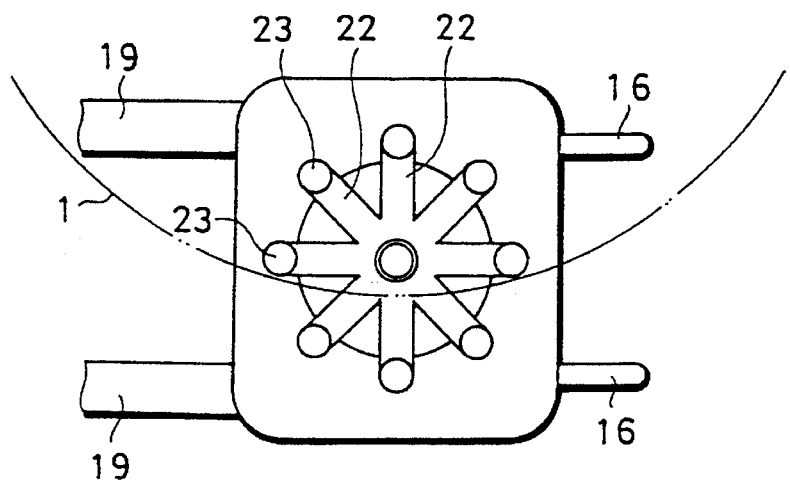
FIG. 4A is a plan view showing a second comparative example of a sliding type magnetic head for magneto-optical recording.
Figure 4B:
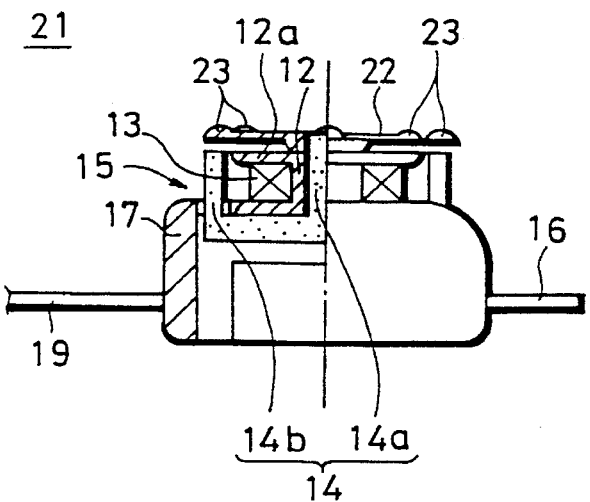
FIG. 4B is a side elevational view showing the magnetic head of FIG. 4A in a fragmentarily cross-sectional fashion.
Figure 5:
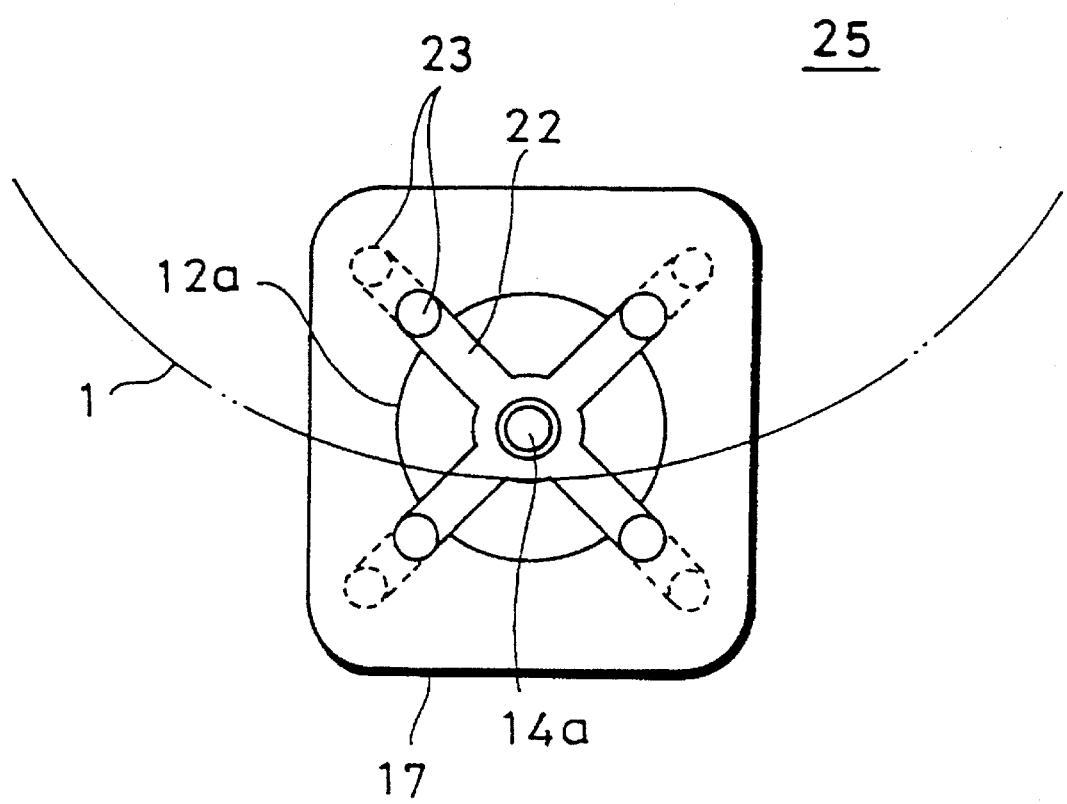
FIG. 5 is a plan view showing a third comparative example of a sliding type magnetic head for magneto-optical recording.
Figure 6A:
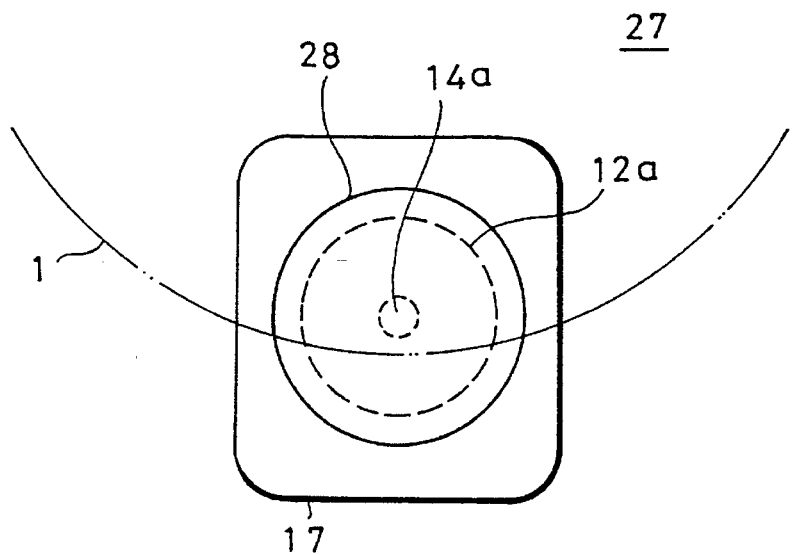
FIG. 6A is a plan view showing a fourth comparative example of a sliding type magnetic head for magneto-optical recording.
Figure 6B:
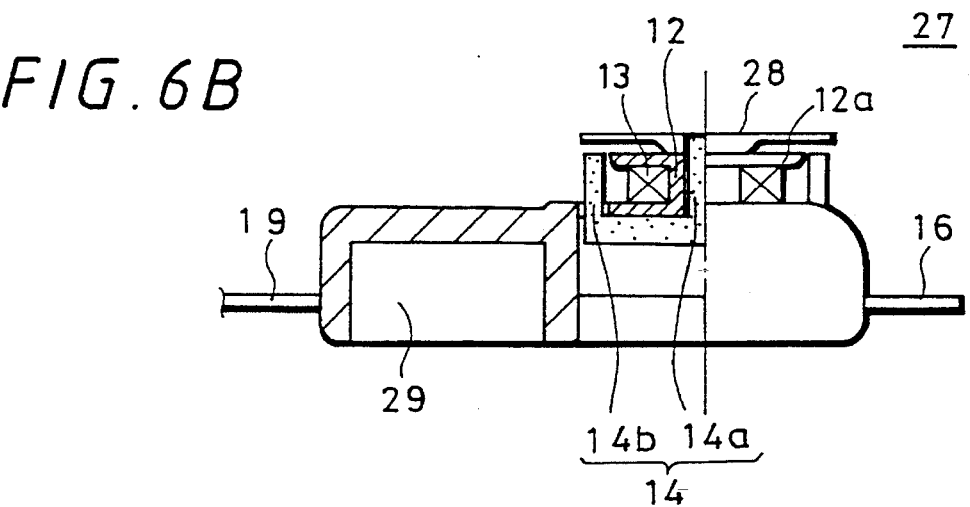
FIG. 6B is a side elevational view showing the magnetic head of FIG. 6A in a fragmentarily cross-sectional fashion.
Figure 7:
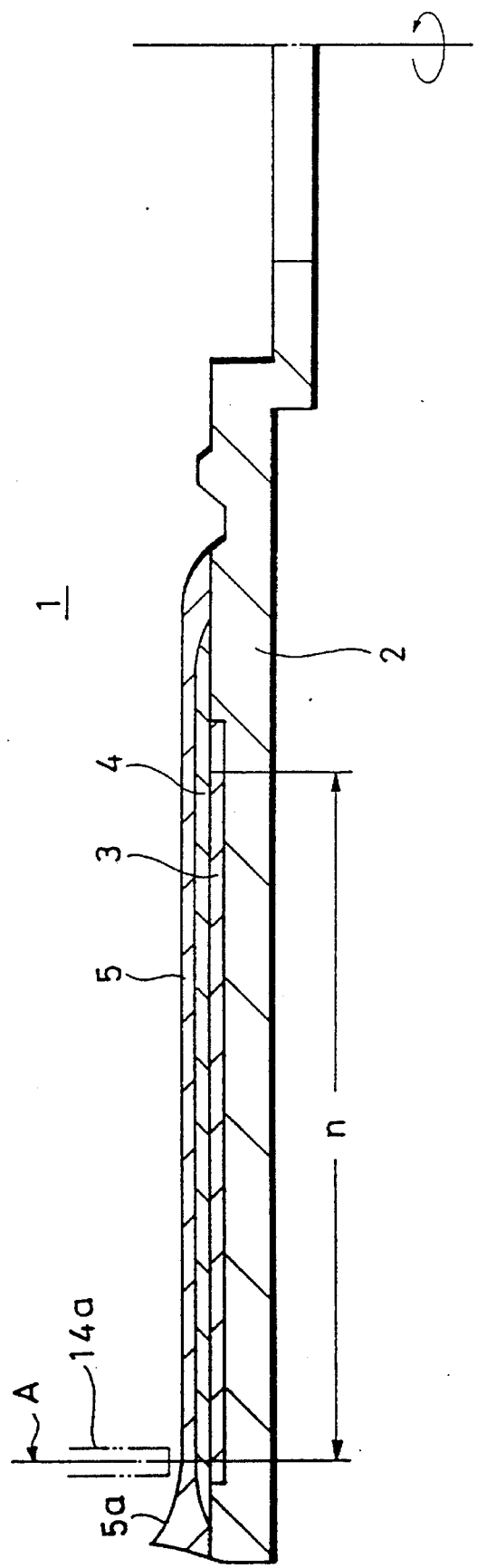
FIG. 7 is a cross-sectional view illustrative of a magneto-optical disc, and to which references will be made in explaining the present invention.
Figure 8:
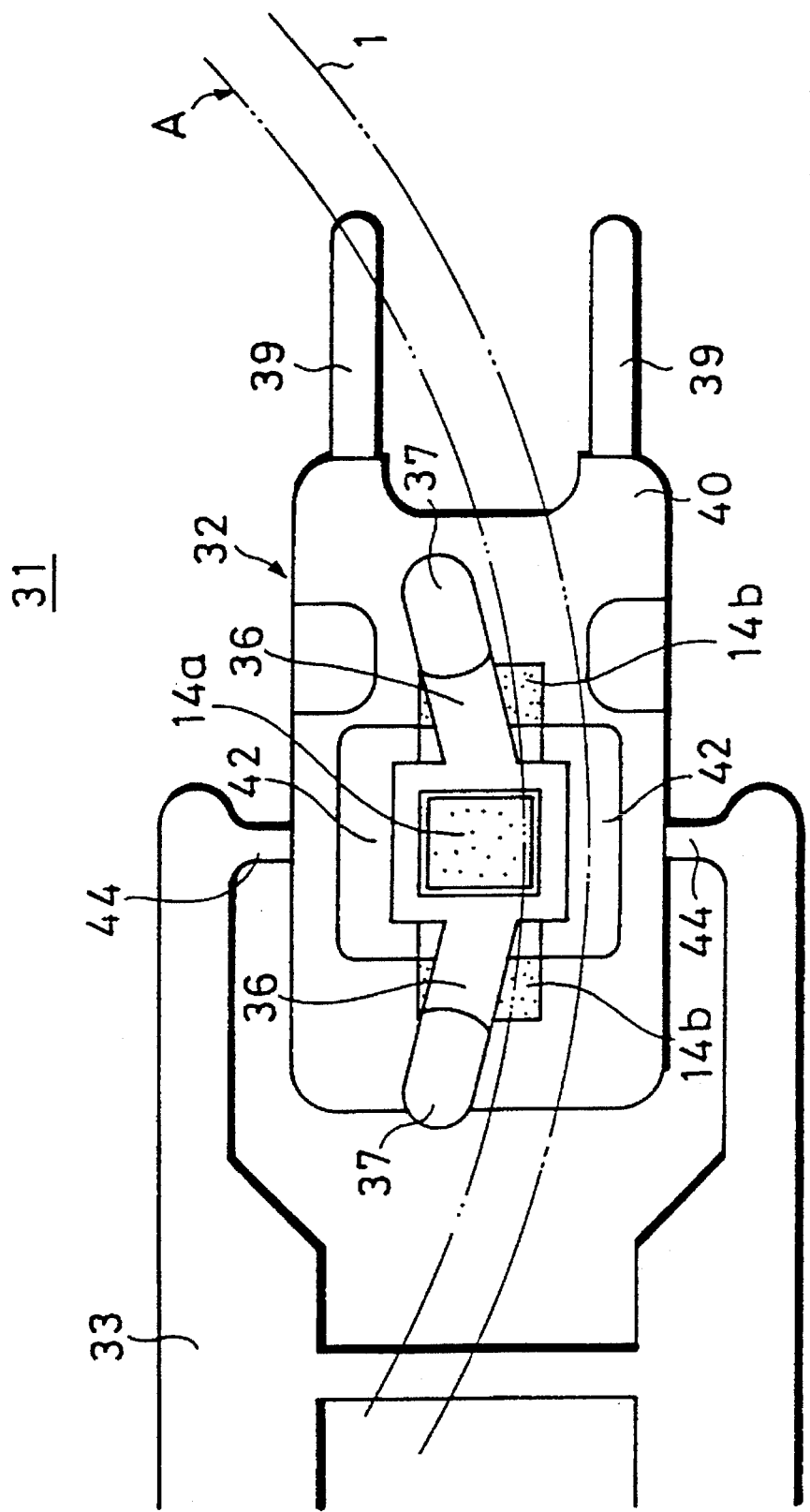
FIG. 8 is a plan view showing a sliding type magnetic head for magneto-optical recording according to a first embodiment of the present invention.
Figure 9:
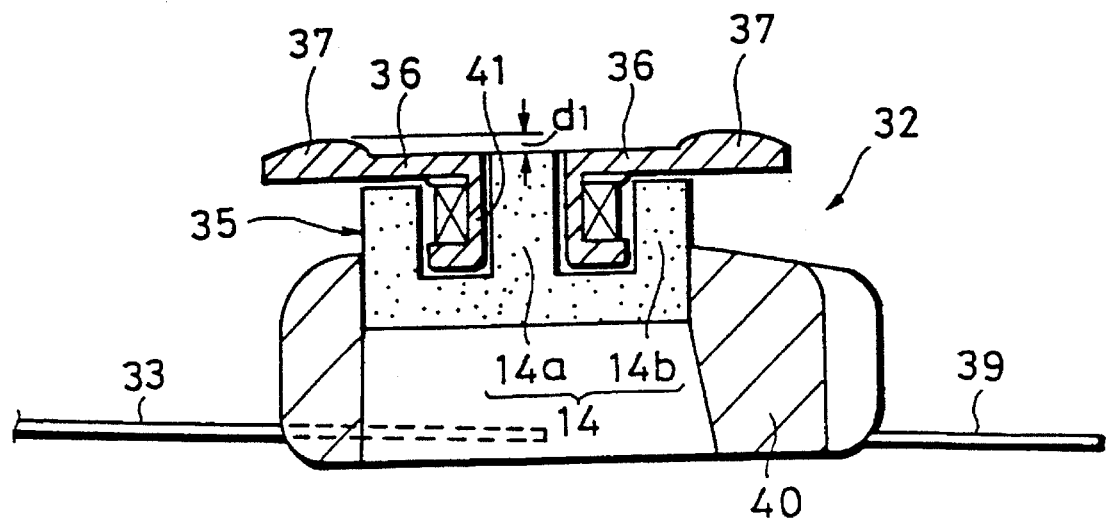
FIG. 9 is a cross-sectional view of the sliding type magnetic head shown in FIG. 8.
Figure 10:
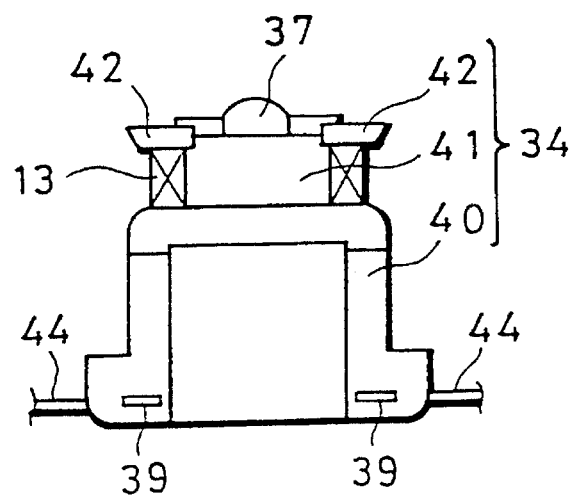
FIG. 10 is a side elevational view of the sliding type magnetic head shown in FIG. 8.

FIGS. 8 to 10 show a sliding type magnetic head for magneto-optical recording according to a first embodiment of the present invention. As illustrated, a magnetic head 31 according to this embodiment comprises a head body 32 and a head arm 33 for supporting the head body 32 thereon.

The head body 32 comprises a magnetic head element 35 in which a bobbin 34 having a coil 13 wound therearound is mounted on a central magnetic pole core 14a of a ferrite magnetic core 14 of substantially E-shaped configuration composed of the central magnetic pole core 14a and a side magnetic pole core 14b, extended portions 36 unitarily formed with the top of the bobbin 34 so as to extend right and left and sliding portions 37 integrally formed on the free ends of the extended portions 36 so as to directly come in sliding contact with the magnetic disc 1.

Figure 12:
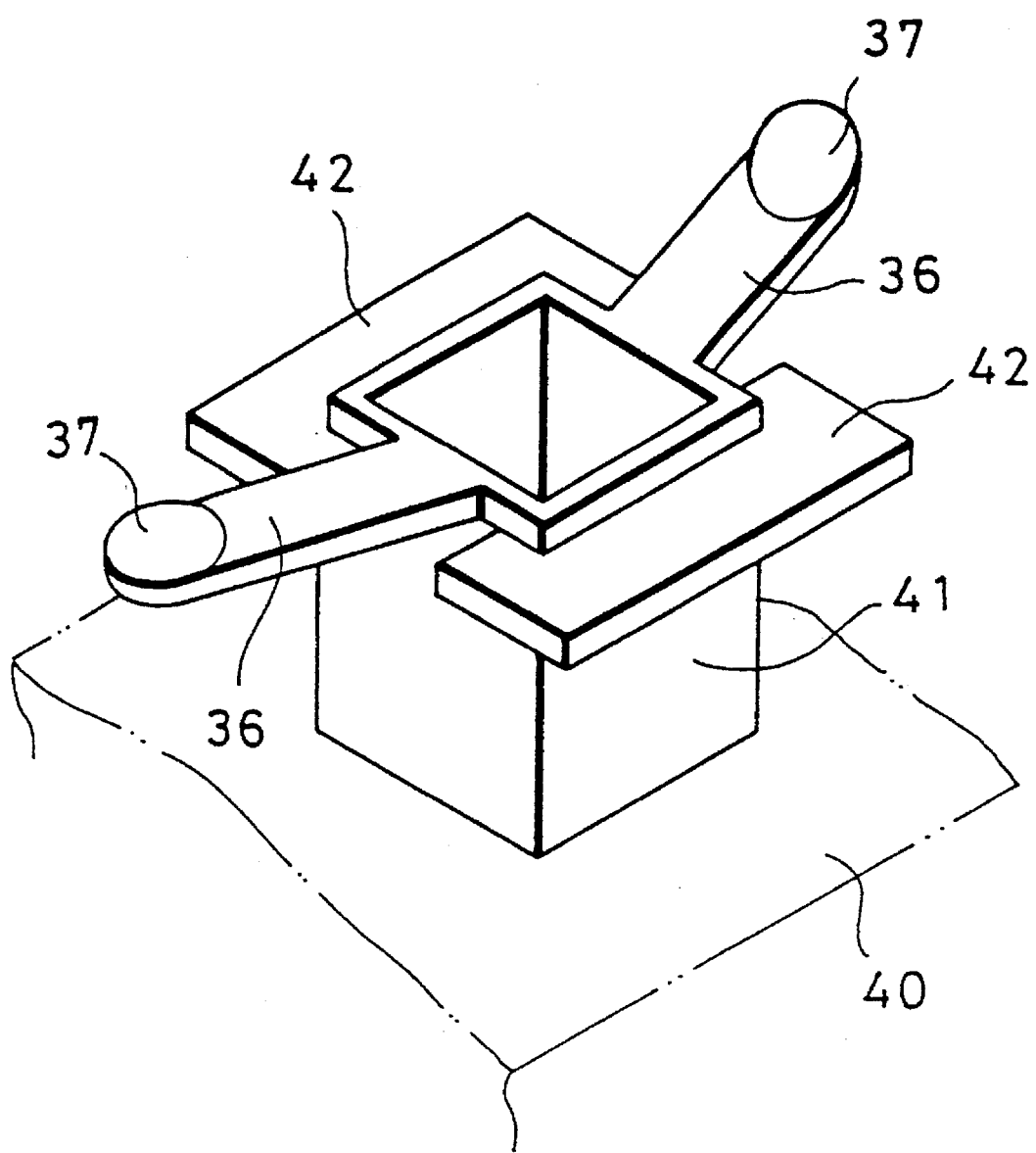
FIG. 12 is a perspective view showing a main portion of the sliding type magnetic head shown in FIG. 8.

The bobbin 34 comprises a terminal base 40 having terminals 39 implanted thereon, a winding core portion 41 and an upper flange portion 42. The upper flange portion 42 is halved. As shown in FIG. 12, the extended portions 36 are formed on the top of the winding core portion 41 above the upper flange portions 42 so as to pass the spacing between the two upper flange portions 42 with an inclination toward the inner peripheral sides of the magnetic disc 1. The sliding portions 37 are integrally formed with the free ends of the extended portions 36. The sliding portions 37 are round-cornered in the shapes such as spherical surfaces or the like at their surfaces in which they are brought in contact with the disc surface.

The E-shaped ferrite magnetic core 14 is mounted into the terminal base 40 so that the central magnetic pole core 14a thereof is inserted into the central aperture of the winding core portion 41 and that the respective side magnetic pole cores 14b thereof are inserted into apertures of the terminal base 40. The ends of the coil 13 are electrically connected to a pair of terminals 39, respectively.

The bobbin 34, the extended portions 36 and the sliding portions 37 are molded by an insert molding process of plastics material such as polyamide, polyphenylene sulfide, polyarylate or the like which are excellent in sliding property and heat-resistance property or the like.

The top of the head arm 33 has bifurcate tops and supports the head body 32, accordingly, the terminal base 40 by means of gimbal portions 44 of predetermined widths extended at a right angle from the respective side ends thereof. The head arm 33 is made of a metal plate having a thickness of 0.02 mm to 0.3 mm, for example, of nickel silver, beryllium copper, phosphor bronze or the like.

In the head body 32 of this embodiment, under the condition that the sliding portions 37 formed at the tops of the extended portions 36 are brought in contact with the disc surface, the end face of the magnetic core 14 (particularly the central magnetic pole core 14a) of the magnetic head element 35 is spaced from the disc surface by a very short distance $d_1$.

In this magnetic head 31, the extended portions 36 having the sliding portions 37 are made of the resilient material and a load that is imposed upon the disc surface by the head body 32 is set by a spring force of the head arm 33.

As other method of setting a load imposed upon the disc surface by the head body 32, there can be employed a method in which a spring force of the head arm 33 is weakened and a coil spring is interposed between the terminal base 40 and a spring supporting member (not shown) extended from the base portion of the head arm 33 so that the load can be set by a spring force of this coil spring interposed.

The magnetic head 31 thus arranged is sliding such that the head body 32 is brought at its sliding portions 37 in contact with the disc surface. If the disc surface has irregularities such as bumps or the like, the extended portions 36 having the sliding portions 37 can absorb shocks that is imposed upon the sliding portions 37 by the bumps or the like. Also, the structure of the above-mentioned magnetic head 31 is enough to follow the disc surface displacements of the magneto-optical disc 1.

According to the magnetic head 31 of the present invention, since the sliding portions 37 are disposed on the tops of the extended portions 36 inclined toward the inner peripheral side of the magneto-optical disc 1 relative to the central magnetic pole core 14a, even when the central magnetic pole core 14a is brought to the outer peripheral point A of the reliable recording and reproducing region n on the magneto-optical disc 1, the sliding portion 37 is located at the position sufficiently spaced from the bump portion 5a formed at the outermost peripheral portion of the magneto-optical disc 1, thereby the sliding portion 37 being prevented from hitting the bump portion 5a. Therefore, the head body 32 can be avoided from being made unable to record and reproduce information due to the disc surface displacements of the magneto-optical disc 1 and the defocusing of the optical pickup system when the sliding portion 37 hits the bump portion 5a. Thus, the magnetic head 1 can be stably transported over the whole area of the reliable recording and reproducing region n of the magneto-optical disc 1, thereby widening the actual recording and reproducing region. That is, the utilization factor of the reliable recording and reproducing region n can be improved.

Since the sliding portion 37 can be prevented from coming out of the magneto-optical disc 1 even when the central magnetic pole core 14a is located at the outer peripheral point A of the reliable recording and reproducing region n, the magneto-optical disc 1 itself and a disc cartridge that accommodates therein the magneto-optical disc 1 can be miniaturized, which can as a result promote the miniaturization of the magneto-optical disc apparatus.

The sliding portion 37 is provided on the extended portion 36 independently extended from the upper flange portion 42 of the bobbin 34 so that, even if the upper flange portion 42 is deformed when the coil 13 is wound around the bobbin 34, such influence of the deformed upper flange portion 42 can be prevented from being exerted upon the sliding portion 37. Therefore, the head body 32 can be stably brought in contact with the disc surface. Further, this sliding type magnetic head 31 can be manufactured with excellent yield.

Figure 11:
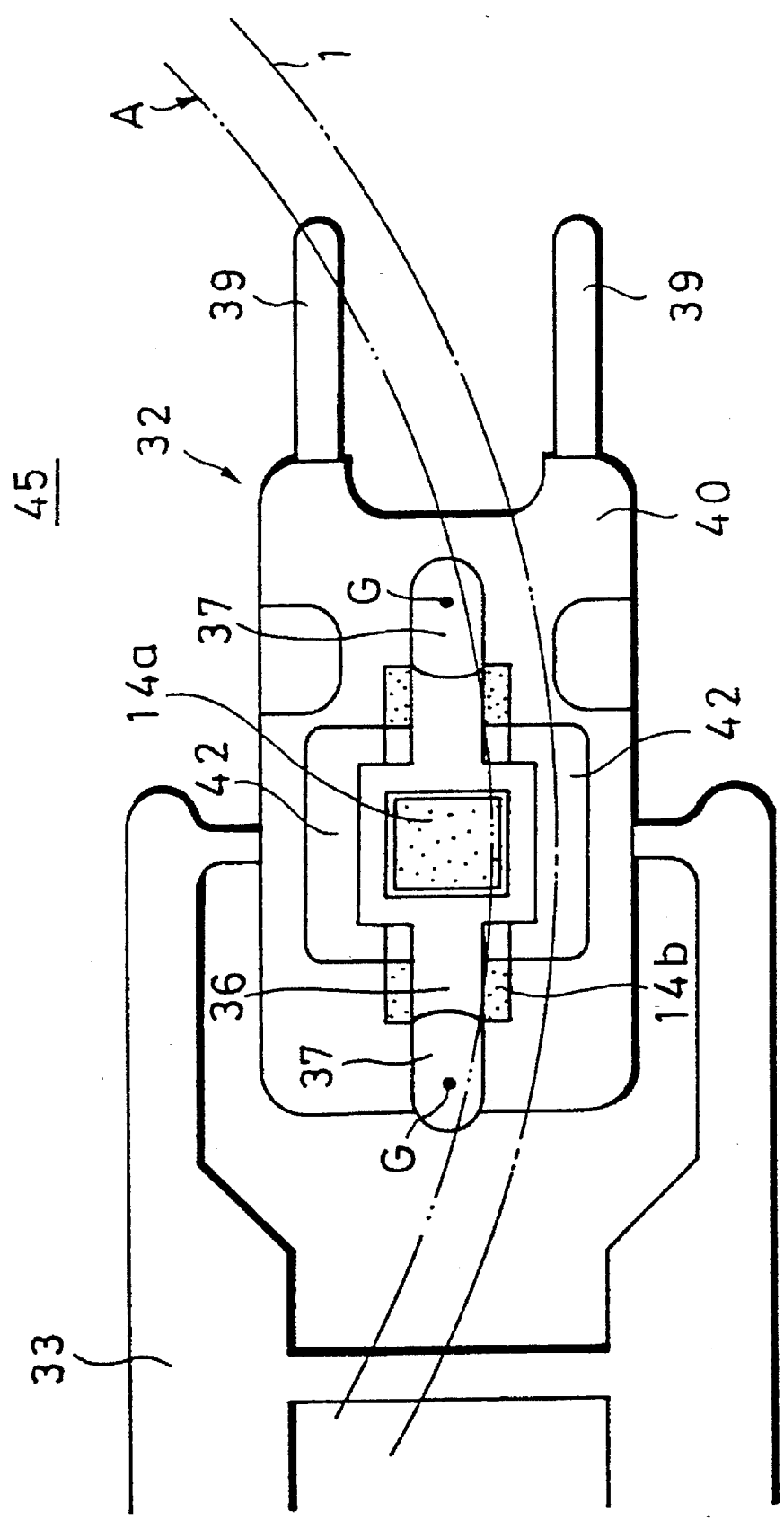
FIG. 11 is a plan view showing a sliding type magnetic head for magneto-optical recording according to a second embodiment of the present invention.

FIG. 11 shows a second embodiment of the present invention. While the extended portions 36 having the sliding portions 37 that are extended right and left from the top of the bobbin 34 are inclined toward the inner peripheral sides of the magneto-optical disc 1 as shown in FIG. 8, the extended portions 36 having the sliding portions 37 are not inclined toward the inner peripheral sides of the magneto-optical disc 1 but are extended from the top of the bobbin 34 in the left and right horizontal direction along the central axis.

In this case, the width of the extended portion 36 is selected to be smaller than that of the end face of the central magnetic pole core 14a similarly to FIG. 8 and the length thereof is selected so that, when the outer peripheral portion of the central magnetic pole core 14a is brought to the outer peripheral point A of the reliable recording and reproducing region n, a central point G of the sliding portion 37 is located at the inner peripheral side of the outer peripheral portion of the central magnetic pole core 14a and may not hit the bump portion 5a. A rest of the arrangements of FIG. 11 is similar to that of FIG. 8 and need not be described in detail.

Since the sliding portion 37 is located at the inner peripheral side of the magneto-optical disc 1 from the outer peripheral portion of the central magnetic pole core 14a in the magnetic head 45 thus arranged, the disc surface displacements and the defocusing of the optical pickup system that are caused when the sliding portion 37 hits the bump portion 5a can be avoided and also the magnetic head 45 can be prevented from being made unable to record and reproduce information. Thus, the head body 32 can be stably transported over the whole area of the reliable recording and reproducing region n. Further, shocks that are imposed upon the magneto-optical disc 1 by the disc surface irregularities such as the bumps or the like can be absorbed by the extended portion 36 and hence alleviated.

Figure 13:
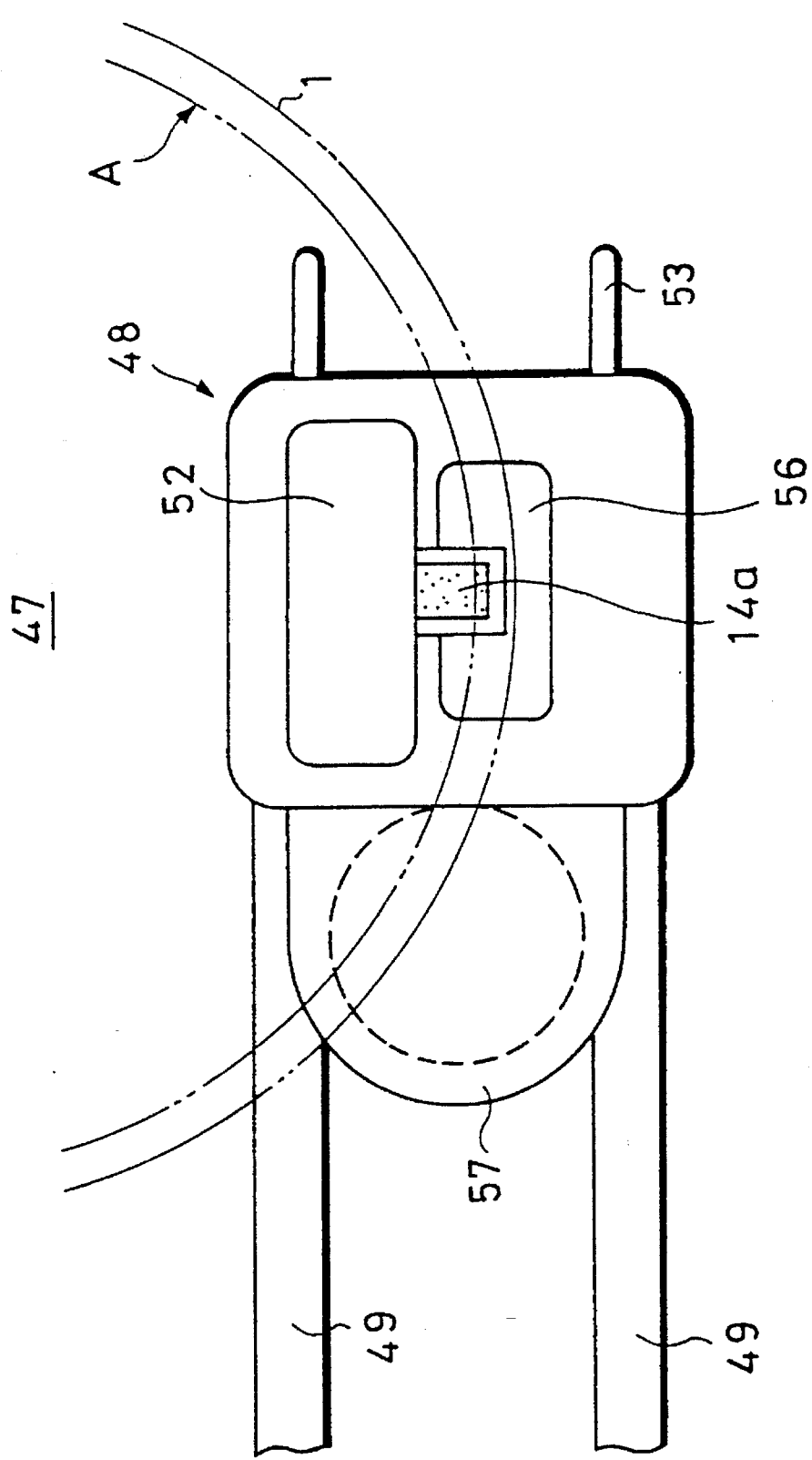
FIG. 13 is a plan view showing a sliding type magnetic head for magneto-optical recording according to a third embodiment of the present invention.
Figure 14:
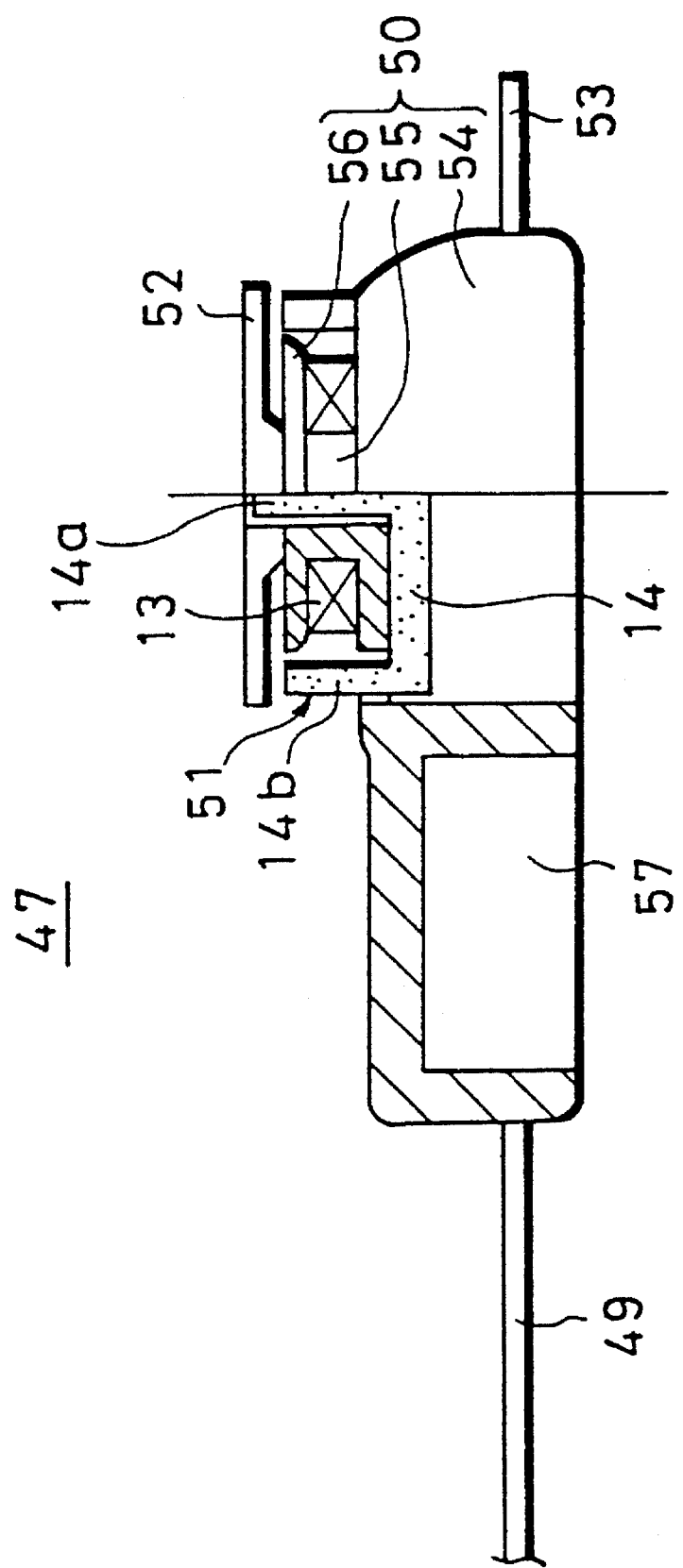
FIG. 14 is a side elevational view showing the sliding type magnetic head shown in FIG. 13 in a fragmentarily cross-sectional fashion.

FIGS. 13 and 14 show a third embodiment of the present invention. In FIGS. 13 and 14, reference numeral 47 generally designates a magnetic head according to this embodiment, reference numeral 48 designates a head body thereof and 49 a head arm thereof for supporting the head body 48.

The head body 48 comprises a magnetic head element 51 in which a bobbin 50 having the coil 13 wound therearound is mounted on the central magnetic pole core 14a of the ferrite magnetic core 14 of substantially E-shaped configuration formed of the central magnetic pole core 14a and a side magnetic pole core 14b, and a sliding portion 52 formed integrally with the top of the bobbin 50 so as to directly come in sliding contact with the magneto-optical disc 1. The sliding surface of the sliding portion 52 is formed of a proper surface such as a cylindrical surface, a spherical surface or a round-cornered surface.

The bobbin 50 comprises a terminal base 54 having terminals 53 implanted thereon, a winding core portion 55, an upper flange portion 56 and a coil spring receiving portion 57 formed on one side of the terminal base 54 so as to receive a coil spring (not shown). The upper flange portion 56 is formed only one side of the bobbin 50, and the sliding portion 52 is integrally formed on the opposite side of the upper flange portion 56 formed on the winding core portion 55 disposed above the upper flange portion 56, i.e., on the inner peripheral side of the magneto-optical disc.

The bobbin 50, the sliding portion 52 and the coil spring receiving portion 57 are molded by an insert molding process of plastics materials such as polyamide, polyphenylene sulfide, polyarylate or the like together with the terminals 53 and the head arm 49. The head arm 49 is made of a metal material such as nickel silver, beryllium copper, phosphor bronze or the like.

In this magnetic head 47, a coil spring is interposed between a spring supporting member extended from the base portion of the head arm 49 and the coil spring receiving portion 57, though not shown. A load that is imposed upon the disc surface when the head body 48 is brought in contact with the disc surface is set by a spring force of the above coil spring interposed. Also in this case, the end face of the ferrite magnetic core 14 of the magnetic head element 51 is spaced from the disc surface by a very small distance under the condition that the sliding portion 52 is brought in contact with the disc surface.

Since the sliding portion 52 is located at the inner peripheral side of the disc relative to the central magnetic pole core 14a in the magnetic head 47, even when the central magnetic pole core 14a is located at the outer peripheral point A of the reliable recording and reproducing region n, the sliding portion 52 is brought in sliding contact with the inner peripheral side of the bump portion 5a formed on the outermost periphery of the magneto-optical disc. Therefore, the magnetic head 46 can be stably transported to the outside point A of the reliable recording and reproducing region n, thereby widening the actual recording and reproducing region of the magneto-optical disc.

Further, since the sliding portion 52 is disposed independently of the upper flange portion 56 of the bobbin 50, the sliding portion 52 can be prevented from being affected by the upper flange portion 56 when the upper flange portion 56 is deformed. Therefore, the stable transport of the magnetic head can be maintained and the magnetic head can be manufactured with excellent yield.

Figure 15:
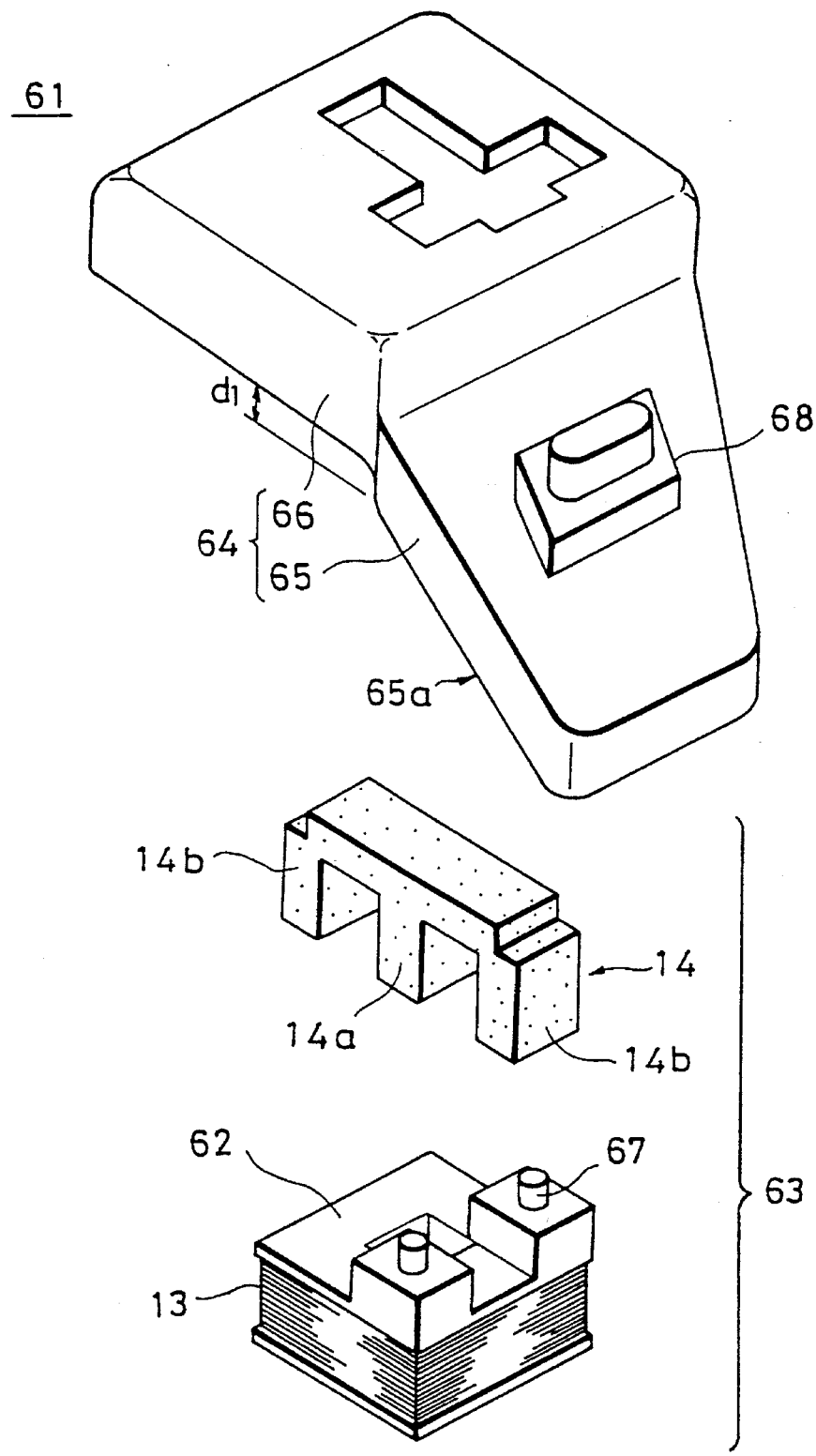
FIG. 15 is an exploded perspective view showing a sliding type magnetic head for magneto-optical recording according to a fourth embodiment of the present invention.
Figure 16:
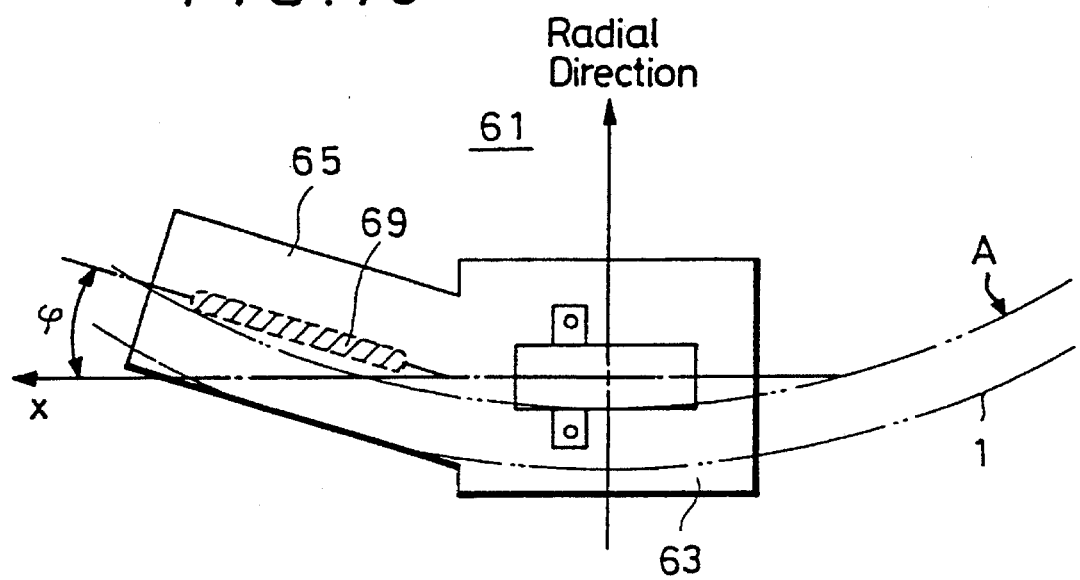
FIG. 16 is a plan view schematically showing the sliding type magnetic head shown in FIG. 15.
Figure 17:
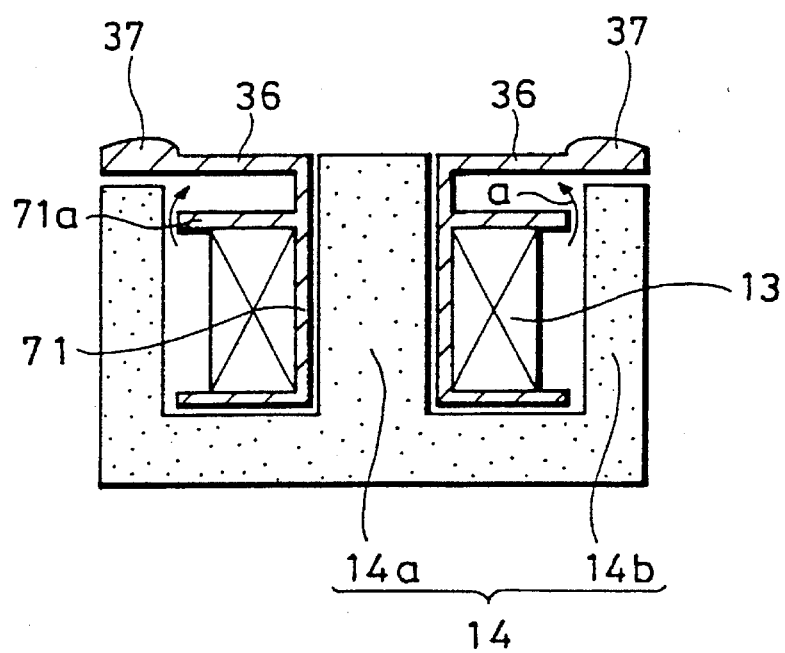
FIG. 17 is a cross-sectional view showing a main portion of a sliding type magnetic head for magneto-optical recording according to a fifth embodiment of the present invention.

FIGS. 15 and 16 show a fourth embodiment of the present invention. FIG. 15 shows only a head body 61. As shown in FIGS. 15 and 16, the head body 61 comprises a magnetic head element 63 in which a bobbin 62 having a coil 13 wound therearound is mounted on the central magnetic pole core 14a of the ferrite magnetic core 14 of substantially E-shaped configuration composed of the central magnetic pole core 14a and the side magnetic pole core 14b and a mounting portion 66 unitarily formed on one side of a sliding member 64 at its sliding portion 65 that directly comes in sliding contact with the magneto-optical disc 1 and into which the magnetic head element 63 is accommodated. In FIG. 15, reference numeral 67 designates a terminal.

The mounting portion 66 is withdrawn at its surface to which the head element 63 is opposed from the sliding surface 65a of the sliding portion 65 by a very small spacing $d_1$. As shown in FIG. 16, the sliding portion 65 is inclined at its longitudinal direction toward the inner peripheral side of the magneto-optical disc 1 by a predetermined angle $\phi$ relative to the transport direction x of the head element 63. In FIG. 16, reference numeral 69 designates a contact portion with the magneto-optical disc 1. The sliding portion 65 and the mounting portion 66 are molded by an integral molding process of a resin.

The head body 61 is supported on the top of the head arm (not shown) over the attachment portion 68 on the upper surface of the sliding portion 65.

In the magnetic head thus arranged, the sliding portion 65 disposed on one side of the head element 63 is inclined toward the inner peripheral side of the magneto-optical disc 1 relative to the transport direction x of the head element 63 so that, even when the central magnetic pole core 14a of the head element 63 is located at the outer peripheral point A of the reliable recording and reproducing region n, the sliding portion 65 does not hit the bump portion 5a formed on the outermost periphery of the magneto-optical disc 1 and can slide in contact with the magneto-optical disc 1 from the inner peripheral side of the bump portion 5a. Therefore, the magnetic head can stably be transported to the outer peripheral point A of the reliable recording and reproducing region n of the magneto-optical disc 1, thereby improving utilization factor of the reliable recording and reproducing region n.

Similarly as described above, the magneto-optical disc and the disc cartridge that accommodates therein the magneto-optical disc can both be miniaturized.

While the upper flange portion 42 of the bobbin 34 is halved and the extending portions 36 having the sliding portions 37 are extended therebetween as described with reference to FIG. 8 or 11, the present invention is not limited thereto and the following variant is also possible. That is, an upper flange portion 71a on a bobbin 71 is not divided and the extending portions 36 extended right and left may be formed on the top of the bobbin 71 and the sliding portions 37 may be formed on the free ends of the extending portions 36.

According to the above-mentioned structure, since the extending portions 36 having the sliding portions 37 are formed independently of the upper flange portion 71a, the actual recording and reproducing region can be widened. Also, even when the upper flange portion 71a is deformed as shown by an arrow a in a so-called coil winding or the like, an influence of the deformed upper flange portion 71a can be prevented from being exerted upon the sliding portion 37 and the sliding portion 37 can be kept in a normal condition.

According to the magnetic head of the present invention, the magnetic head can be stably transported to the outer peripheral point of the reliable recording and reproducing region of the recording medium, whereby the actual recording and reproducing region can be widened and the utilization factor of the so-called reliable recording and reproducing region can be increased. At the same time, the recording medium and the disc cartridge that accommodates therein the recording medium can both be miniaturized.

Further, when the sliding portion of the head body is provided on the extending portion which is extended toward the inner peripheral side of the recording medium from the top of the bobbin of the head element with an inclination, the head body can be stably transported even at the outer peripheral point of the reliable recording and reproducing region similarly as described above. Furthermore, shocks that are imposed upon the magnetic head by the bump formed on the surface of the recording medium or the like can be absorbed by the extending portion and this structure of the magnetic head can sufficiently follow the change of the shape of the recording medium surface.

In addition, when the sliding portion is integrally formed on the top of the coil bobbin independently of the flange portion of the coil bobbin of the head element, the sliding portion can be prevented from being affected by the deformation of the flange portion and the head body can be stably transported. Also, the yield with which the magnetic head is manufactured can be improved.

Having described preferred embodiments of the invention with reference to the accompanying drawings, it is to be understood that the invention is not limited thereto and that various changes and modifications could be effected therein by one skilled in the art without departing from the spirit or scope of the invention as defined in the appended claims.

What is claimed is:

1. A sliding type magnetic head for magneto-optical recording, comprising:
    a head body, said head body having a head element, and
    a sliding portion which comes in sliding contact with a recording medium, wherein said sliding portion is disposed on flexible extending portions that extend from a fixed end at a top of a coil bobbin of said head element to a free end having said sliding portion so that said flexible extending portions are between said sliding portion and said head element, said flexible extending portions are extended with an inclination toward an inner periphery of said recording medium from said top of said coil bobbin of said head element, said sliding portion being free of said recording medium toward an outer periphery of said recording medium.

* * * * *